Oct. 16, 1956 L. J. GRINER 2,767,238
STORAGE BATTERY GUARANTEE LABEL
Filed April 16, 1952
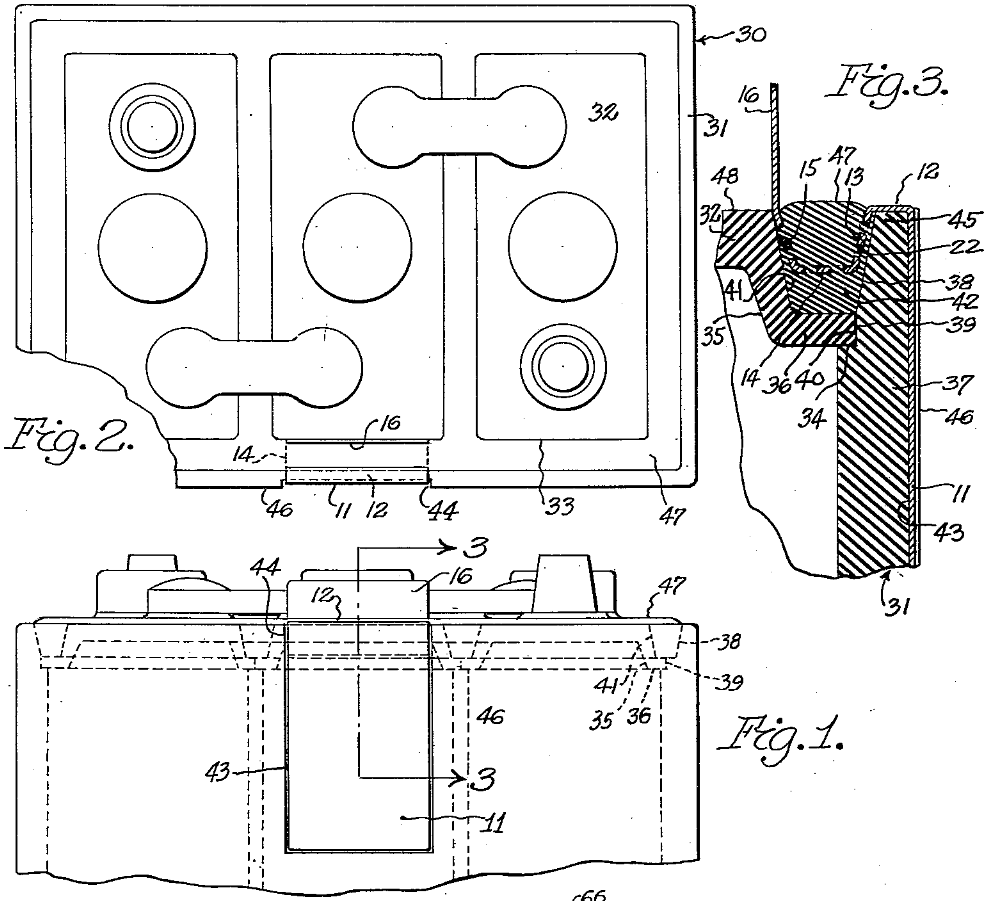
Fig. 2. Fig. 3. Fig. 1.
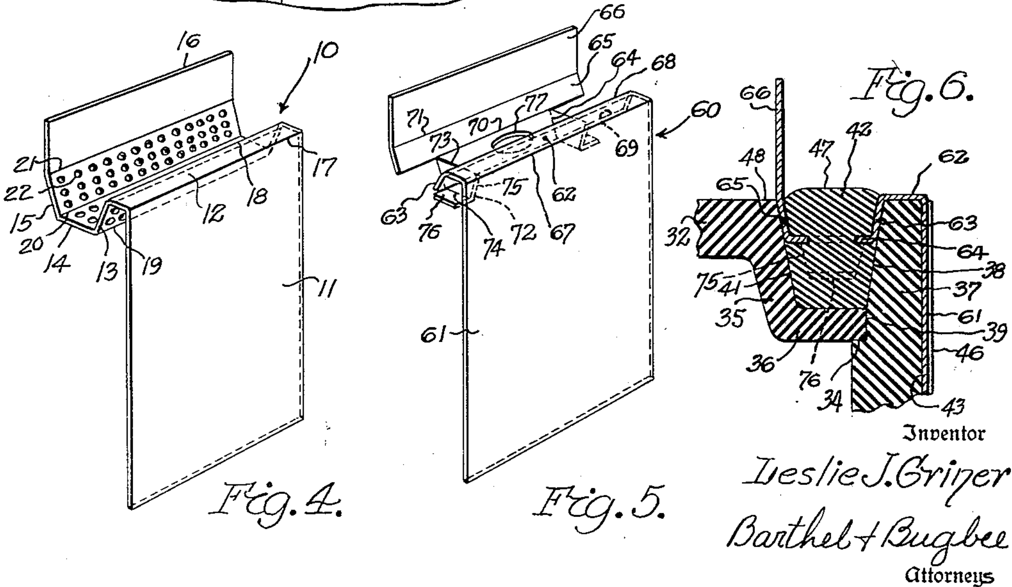
Fig. 6.
Fig. 4. Fig. 5.
Inventor
Leslie J. Griner
Barthel + Bugbee
Attorneys 2,767,238
Patented Oct. 16, 1956

2,767,238

STORAGE BATTERY GUARANTEE LABEL

Leslie J. Griner, Detroit, Mich., assignor of one-third to Harold L. McAtee, La Vale, Md., and one-third to Roland K. Burgie, Grand Rapids, Mich.

Application April 16, 1952, Serial No. 282,734

2 Claims. (Cl. 136—181)

This invention relates to storage batteries and, in particular, to guarantee cards or labels for such batteries.

Manufacturers of storage batteries sustain losses running into many hundred thousands of dollars per year in fraudulent claims presented on such batteries which have been returned to the manufacturer as having allegedly failed within the guarantee period of 90 days, whereas they have actually been subjected to service much longer than 90 days. Storage batteries as at present marketed are sold with guarantee cards which are supposed to be filled out by the dealer when the battery is sold. Actually, many dealers neglect to fill out the card at the time that the battery is sold, with the result that when the battery is returned for a refund for having failed in service, the customer fills in the dates and speedometer reading to suit his own convenience in order to enable him to place the date of returning within the guarantee period. Moreover, certain dealers as a favor to their customers will sometimes fill out the guarantee card with false data, thereby defrauding the manufacturer.

The battery guarantee card or label of the present invention is permanently attached to the battery itself by having a portion anchored in the sealing compound in the top of the battery box, a detachable ticket being provided which duplicates the data given on hte label permanently attached to the battery box.

One object of this invention is to provide a storage battery guarantee card or label which is permanently attached to the storatge battery and is sold with the battery, a ticket being detachably attached to the card or label and bearing duplicate identification information and the sales date, the same as on the card or label.

Another object is to provide a storage battery guarantee card or label of the foregoing character wherein a portion of the card or label is embedded in the sealing compound by which the top of the battery is secured to the battery box or case, with or without perforations to permit interpenetration of the sealing compound.

Another object is to provide a storage battery guarantee card or label of the foregoing character wherein there is provided a depression in the battery case to receive the card or label so that it will not be defaced during shipment or use.

Another object is to provide a storage battery guarantee card or label of the foregoing character wherein the detachable ticket is detachably attached to the remainder of the card or label and projects upward out of the sealing compound at the edge of the top of the battery until the battery is sold, whereupon the ticket is torn off and retained by the dealer, leaving the card with the duplicate data in the hands of the customer.

Other objects and advantages of the invention will become apparent during the course of the following description of the accompanying drawings, wherein:

Figure 1 is a fragmentary side elevation of the upper portion of a storage battery, equipped with the guarantee label or card of the present invention;

Figure 2 is a top plan view of the storage battery equipped with the guarantee card or label shown in Figure 1;

Figure 3 is an enlarged fragmentary vertical section taken along the line 3—3 in Figure 1, showing the card or label attached to the battery by having a neck portion embedded in the sealing compound;

Figure 4 is a perspective view of the battery guarantee card or label with its attached ticket, before the application to the battery;

Figure 5 is a perspective view of a modified battery guarantee card or label and ticket; and Figure 6 is an enlarged fragmentary vertical section similar to Figure 3, but showing the manner of embedding the modified battery guarantee card or label of Figure 5 in the battery sealing compound.

Referring to the drawing in detail, Figure 4 shows a battery guarantee card, generally designated 10, according to the present invention and including a main or data portion 11, a casing edge engaging portion 12, an immersion portion 13, 14, 15 adapted to be embedded in the battery sealing compound, as explained below, and a detachable dealer's ticket or stub portion 16 duplicating certain of the data on the data portion 11. The card 10 is preferably made of wear and weather-resisting material, such as synthetic plastic, and imprinted with the necessary identifying data, including a means (not shown) for perforating the data portion 11 of the card to indicate the date on which the battery was sold. The perforations are preferably arranged with the punchings partly attached to the remainder of the card so that the proper punchings relating to the date of sale may be pushed out with a pencil or other pointed object at the time the sale is made, without requiring the use of a punch.

The various portions of the card 10 are provided with fold lines 17, 18, 19, 20, 21 at which the card is bent to adapt it to fit the varying configuration of the top and edge of the battery box. Perforations 22 are preferably provided in order to enable the sealing compound to penetrate the immersion portions 13, 14 and 15 more easily to facilitate installation. The ticket portion 16 to be retained by the dealer is provided with duplicate data corresponding to the data on the data portion 11, such as the serial number of the battery and the date of sale, and the bending or folding line 21 is preferably weakened in a conventional way to facilitate tearing off the ticket portion 16 to be retained by the dealer.

The storage battery, generally designated 30, to which the guarantee card or label 10 is attached is for the most part of conventional construction and includes the usual battery box or casing 31, top portions 32 of the individual cells 33 engaging one another at the ledges 34 (Figure 3), the top portions 32 having downwardly bent portions 35 with horizontal flanges 36 engaging the ledges 34, the casing side walls 37 having downwardly sloping top edge portions 38 which terminate in vertical portions 39 engaging the edges 40 of the horizontal flanges 36. The foregoing construction results in the formation of a groove or depression 41 at the edge of the battery casing 31 which is ordinarily filled with a sealing compound 42 of asphaltic material.

For the purposes of the present invention, the battery box or casing 31 is provided on one side thereof with a recess portion 43 (Figures 1 and 3) sufficiently deep and of sufficient size to receive the data portion 11 of the guarantee card or label 10, the battery box or casing 31 being notched as at 44 at its upper edge (Figure 2) so as to facilitate the passage of the upper part of the card or label 10 over the upper edge 45 of the battery casing side wall 37. In this manner, the data portion 11 is disposed below the outer surface 46 of the battery box or casing 31 so as not to be scuffed or defaced during transportation, storage or use.

The portion 12 of the card or label 10 rests upon the top edge 45 of the battery box or casing 31, and the perforated portions 13, 14 and 15 are bent so as to extend downward into the groove or depression 41 between the edge of the cell top 32 and the battery box or casing 31. While the card or label 10 is bent in this manner, the sealing compound 42, which is in a plastic condition, is placed in the recess or depression 41 and forced through the perforations 22, filling the depression 41 and firmly embedding the perforated portions 13, 14 and 15 therein. This procedure leaves the dealer's ticket portion 16 projecting above the top surfaces 47 and 48 of the sealing compound 42 and cell top 32 respectively.

In the use of the guarantee card or label 10, let it be assumed that the card has been installed in the manner shown in Figures 1, 2 and 3 with the anchoring portion consisting of the perforated portions 13, 14 and 15 bent into U-shaped configuration (Figure 3) and embedded in the recess or depression 41 by means of the sealing compound 42, with the ticket 16 projecting upward. It is assumed, of course, that duplicate identification data have been applied at the factory to the data portion 11 and ticket 16, including the serial number of the battery as well as its voltage, number of plates, rating in ampere hours and other necessary information. When the battery is sold, the dealer either stamps the date on the data portion 11 and ticket 16, or preferably punches out the perforations opposite dates already stamped on these portions. He then tears off the ticket 16 and retains it in his possession, the ticket 16 being preferably equipped with the same perforated data indication which cannot afterward be altered.

If the battery fails during the guarantee period, the customer returns it to the dealer who then is able to identify it with the ticket 16 which he retained. If the perforation system is used, the data is unalterably recorded so as to eliminate the possibility of fraud which has previously existed. If the dates in the data portion 11 and ticket portions 16 do not agree, it is a self-evident indication of fraud or at least mistake. The customer may then obtain an adjustment if his claim is a legitimate one falling within the guarantee period of the battery.

The modified battery guarantee card or label, generally designated 60, shown in Figures 5 and 6, is similar in principle to the card or label 10 shown in Figures 1 to 4 inclusive and is similarly applied to the battery. It also has a data portion 61 and a top edge-engaging portion 62, embedding portions 63, 64, 65 and a detachable ticket portion 66. These portions are bent relatively to one another in a similar manner along the bending lines 67, 68, 69, 70 and 71 corresponding to the bending lines 17 to 21 inclusive of Figure 4. In place of the perforations 22 of the card or label 10, the card or label 60 is provided with tabs 72 bent downwardly from opposite ends of the portion 64 along the bending lines 73 and 74 to provide connecting portions 65 and feet 76 which are embedded in the sealing compound 42 at a greater depth than the portions 63, 64 and 75, as shown in Figure 6. An aperture 77 is optionally provided in the center of the embedded portion 64 for facilitating distibution of the sealing compound 42 in the same manner and for the same purpose as the perforations 22 of the card or label 10. The use and marking of the card or label 60 is similar to that of the guarantee card or label 10, the ticket 66 being detached along the preferably weakened folding line 71 in the same manner and retained by the dealer.

What I claim is:

1. In combination with a storage battery having a casing with a cavity adjacent the top edge thereof, a double-ended battery label comprising a sheet member which is approximately S-shaped in longitudinal section having at one end a main portion disposed adjacent the side of said casing, a top portion joined to said main portion and extending across the top edge of said casing, an intermediate anchoring portion connected to said top portion and dipping downwardly into said cavity, and a detachable upstanding stub portion at the other end of said sheet member connected to said anchoring portion on the opposite side thereof from said main portion and top portion and rising out of and above said cavity; and a sealing compound disposed in said cavity, said compound overlying and burying said anchoring portion in said cavity, said stub portion and said main portion having duplicate battery-identifying indicia thereon specific to the particular battery to which said label is attached whereby the comparison of the stub portion detached and retained by the dealer upon sale of the battery with the main portion anchored to and sold with the battery prevents fraudulent return of the battery after expiration of the guarantee period thereof.

2. In combination with a storage batery having a casing with a cavity adjacent the top edge thereof, a double-ended battery label comprising a sheet member which is approximately S-shaped in longitudinal section having at one end a main portion disposed adjacent the side of said casing, a top portion joined to said main portion and extending across the top edge of said casing, an intermediate anchoring portion connected to said top portion and dipping downwardly into said cavity, and a detachable upstanding stub portion at the other end of said sheet member connected to said anchoring portion on the opposite side thereof from said main portion and top portion and rising out of and above said cavity; and a sealing compound disposed in said cavity, said compound overlying and burying said anchoring portion in said cavity, said anchoring portion being of approximately U-shaped configuration in longitudinal section, said stub portion and said main portion having duplicate battery-identifying indicia thereon specific to the particular battery to which said label is attached whereby the comparison of the stub portion detached and retained by the dealer upon sale of the battery with the main portion anchored to and sold with the battery prevents fraudulent return of the battery after expiration of the guarantee period thereof.

References Cited in the file of this patent

UNITED STATES PATENTS

| | | |
|---|---|---|
| 1,384,457 | Fetters | July 12, 1921 |
| 1,540,252 | Chamberlain | June 2, 1925 |
| 1,680,459 | Hemphill | Aug. 14, 1928 |
| 1,796,895 | Pendergast | Mar. 17, 1931 |
| 1,892,580 | Lester | Dec. 27, 1932 |
| 2,065,893 | Heise | Dec. 29, 1936 |
| 2,085,023 | Husted | June 29, 1937 |
| 2,123,956 | Olson | July 19, 1938 |